US008602792B2

(12) United States Patent
Kronik

(10) Patent No.: US 8,602,792 B2
(45) Date of Patent: Dec. 10, 2013

(54) METHOD AND APPARATUS FOR PROVIDING VISUAL COMPARISON BETWEEN PSYCHOLOGICAL AND CHRONOLOGICAL AGES

(76) Inventor: Aleksandr A. Kronik, Rockville, MD (US)

( * ) Notice: Subject to any disclaimer, the term of this patent is extended or adjusted under 35 U.S.C. 154(b) by 49 days.

(21) Appl. No.: 13/293,478

(22) Filed: Nov. 10, 2011

(65) Prior Publication Data

US 2012/0115116 A1  May 10, 2012

Related U.S. Application Data

(60) Provisional application No. 61/344,902, filed on Nov. 10, 2010.

(51) Int. Cl.
*G09B 19/00* (2006.01)

(52) U.S. Cl.
USPC .......................................... 434/236; 434/238

(58) Field of Classification Search
USPC ........ 434/236–238, 196; 273/161; 700/89–91
See application file for complete search history.

(56) References Cited

U.S. PATENT DOCUMENTS

| 574,703 | A | 1/1897 | Bloch |
| 3,673,979 | A | 7/1972 | Kunov |
| 3,764,063 | A | 10/1973 | Siegel |
| 4,464,122 | A | 8/1984 | Fuller et al. |
| 7,302,398 | B2 | 11/2007 | Ban et al. |
| 2005/0197542 | A1 | 9/2005 | Bazin et al. |
| 2005/0228239 | A1 | 10/2005 | Shallenberger |
| 2006/0041461 | A1* | 2/2006 | Vucina et al. ................ 705/8 |
| 2008/0145825 | A1* | 6/2008 | Clark-Wickham ........... 434/196 |
| 2009/0292180 | A1 | 11/2009 | Mirow |
| 2010/0005694 | A1 | 1/2010 | Forte et al. |
| 2010/0168590 | A1 | 7/2010 | Kasama |

OTHER PUBLICATIONS

Kronik, "Suicidal Risk and Psychological Aging of Chernobyl Survivors", Howard University, USA, Report for CCMS/NATO pilot study, "Risk Assesment of Chernobyl Accident Consequences: Lessons Learned for the Future", Rome, Italy, Dec. 16, 2005 (1 page).
Kondrashev, et al., "Psycho-Biographical Analysis with APL", Psycho-biographical Analysis, APL '91, (pp. 244-248).
Kronik, et al., "Sputnik, Digest of the Soviet Press", Dec. 1984, (pp. 70-73).
Kronik, et al., "Trauma and Disaster as Life Disrupters: A Model of Computer-Assisted Psychotherapy Applied to Adolescent Victims of the Chernobyl Disaster", Professional Psychology: Reasearch and Practice, 1999, vol. 30, No. 6, (pp. 586-599).
Kronik, "Guidebook to Personal LifeLook", LifeLook.Net, Dec. 2004 (pp. 1-19).
Aguilar et al., Semantic Spiral Timelines Used as Support for e-Learning, Journal of Universal Computer Science, Apr. 1, 2009, Salamanca, Spain, (pp. 1526-1545).
International Search Report received in corresponding PCT/US11/60120 dated Mar. 29, 2012.

* cited by examiner

*Primary Examiner* — Timothy A Musselman
(74) *Attorney, Agent, or Firm* — Edell, Shapiro & Finnan LLC

(57) ABSTRACT

An easy to understand visual comparison between a person's chronological age and calculated psychological age takes the form of a time scale representing person's estimated lifespan on which the spacing between indicators provides the comparison. In a preferred embodiment the lifespan time scale is in the form of a clock on which respective clock hands represent the chronological age and calculated psychological age.

16 Claims, 9 Drawing Sheets

METHOD AND APPARATUS FOR PROVIDING VISUAL COMPARISON BETWEEN PSYCHOLOGICAL AND CHRONOLOGICAL AGES

CROSS REFERENCE TO RELATED APPLICATION

This application claims priority from U.S. Provisional Patent Application Ser. No. 61/344,902 entitled "Psychological Clock: A Self-help Tool," filed Nov. 10, 2010. The disclosure of this provisional patent application is incorporated herein by reference in its entirety.

BACKGROUND

A typical problem encountered by mental health professionals consists of carrying out express diagnostics of a person's ideas about his/her past, present and future and, on this basis, drawing a preliminary conclusion about the presence of deformations in the subjective picture of the person's way of life, the degree of well-being of his/her present life situation and the risk of disturbing his/her psychological health.

One simple and reliable means for solving this problem is the method of estimation of five year intervals comprising the following: The person is asked to indicate the age to which he hopes to live and to estimate for every five year interval of his/her lifespan, including past and future intervals, the importance or significance to him/her of events occurring in each interval. Events for this purpose are considered to be any changes in environment, behavior and his/her internal world, and the person is instructed to apply point values from zero to ten to indicate event importance. A graph of life is obtained as a result of this testing and yields an objective picture of a person's way of life. The graph is typically a bar chart of the type illustrated in FIG. 1 wherein the horizontal axis represents time divided into successive five year segments of the person's life, and the vertical axis represents the point values of the events assigned by the person to each five year segment. This bar chart appears in the copyrighted article Kondrashev et at., Psycho-Biographical Analysis With APL (APL Quote Quad, Vol. 21, No 4, p. 245) and permission to use it herein has been granted by Association for Computing Machinery (ACM).

The test described above may be utilized to calculate an examinee's psychological age using the formula: $P_A = R \times L$, where $P_A$ is the examinee's psychological age, L is the age to which the examinee hopes to live, and R is the subjective realization of the examinee's life.

The subjective realization of life R may be calculated in any number of ways, one of which is a calculation of the ratio of the total of the past event point values to the total point values of the person's expected entire life. In other words, $R = P_{past}/P_{total}$, where $P_{past}$ is the total of event point values assigned by the examinee to his/her life up to the present date, and $P_{total}$ is the total of event point values assigned by the examinee for his/her entire lifespan. The value of R is thus a fraction with a maximum value of one (i.e., the extreme and unlikely case where all lifespan event points are in the past segments of the examinee's hoped for lifespan) and a minimum value of zero (i.e., the other extreme and unlikely case where all of the event points are in the future segments of the examinee's hoped for lifespan). Larger values of R represent a point of view wherein the past is more significant to the individual, thus making the person's psychological age $P_A$ older; such an individual feels older and has an older person's outlook. Smaller R values, on the other hand, yield younger psychological ages, and such individuals tend to have a brighter and more optimistic outlook on life. Thus, the computed psychological age $P_A$ of a person is often considered in connection with that person's chronological age to provide a measure of the person's sense of contentment, self worth, outlook on life or other important psychological characteristics.

It is desirable to provide a visual indication of chronological age and psychological age from which a comparison of these parameters can be made and readily understood.

SUMMARY OF THE INVENTION

The present invention is a method for providing a visible indication (e.g., on a computer screen, hard copy, etc.) of an examinee's chronological or calendar age and the calculated psychological age to facilitate comparison thereof. In a preferred embodiment the method includes: establishing on a computer screen a lifespan time scale representing the examinee's expected lifespan as entered by the examinee; providing a first indicator representing the examinee's chronological age, as entered by the examinee or determined based on the examinee's entered birth date, at a first location on the lifespan time scale; and providing a second indicator representing the examinee's calculated psychological age at a second location on the lifespan time scale; wherein the spacing on the lifespan time scale between the first and second indicators represents the difference between the examinee's chronological age and calculated psychological age.

In a preferred embodiment the lifespan time scale is an angular scale in the form of a circle simulating a clock face, the first indicator is a first radial line simulating a clock hand at an angular position corresponding to the chronological age on the clock time scale, the second indicator is a second radial line simulating a clock hand at an angular position corresponding to the calculated psychological age on the clock time scale, and wherein the angular spacing between the first and second radial lines is a measure of the difference between the chronological age and the calculated psychological age. The examinee's chronological age may be entered directly by the examinee or calculated from the examinee's entered date of birth and the system calendar clock data.

Other embodiments of the inventive concept are possible. For example, the lifespan time scale may be a linear scale having one end representing age zero or birth and an opposite end representing the entered age at the end of the expected lifespan. In this embodiment the first indicator is a first line or other indicium located at a position relative to the lifetime scale corresponding to the chronological age, a second indicator is a second line or other indicium located at a position relative to the lifetime scale corresponding to the calculated psychological age, and the linear spacing between the first and second indicators is a measure of the difference between the chronological age and the calculated psychological age.

Alternatively, the lifespan time scale may be a radial scale having a series of spaced concentric rings with a radial center representing birth and an outermost ring representing the end of the entered expected lifespan. In this embodiment the first indicator involves visibly distinguishing (i.e., by color, brightness, line segmenting, etc.) one of the rings to represent the chronological age, the second indicator involves visibly distinguishing an other of the rings to represent the calculated psychological age on said radial time scale, and the radial spacing between the visibly distinguished rings is a measure of the difference between the chronological age and the calculated psychological age.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

The preferred embodiment of the present invention is described below in the context of a psychological self-test performed on a computer with a computer screen providing the required display of the test results. It is to be understood that the test need not be performed on a computer and the display need not be presented on a computer screen. For example, the test may administered by a mental health professional who provides the displayed results on a paper sheet, etc. The test can results can alternatively be presented in a puzzle, on an article of clothing, etc.

The following detailed explanations of FIGS. 2-10 and of the preferred embodiments reveal the methods and apparatus of the present invention.

In accordance with a preferred embodiment of the present invention an examinee at a computer accesses a program, either on-line via the internet or locally from a disc or the computer hard drive, that provides a series of prompts in response to which the examinee enters appropriate responses in a designated data entry field appearing on the computer screen. The examinee's responses are stored for processing.

Figure 1:
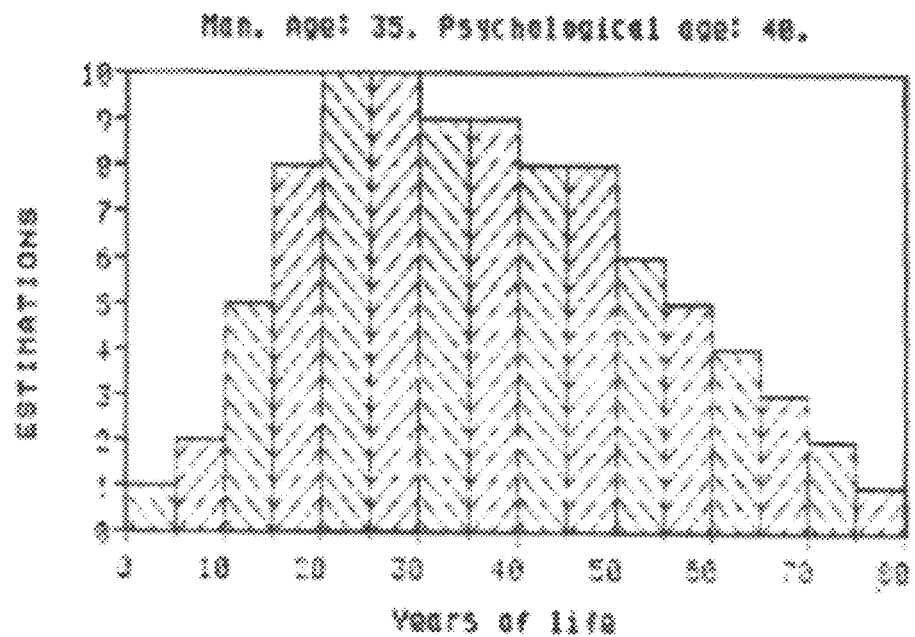
FIG. 1 is a bar graph of estimated point values versus years of life as entered by an examinee as part of determining the examinee's psychological age used in the present invention.
Figure 2:
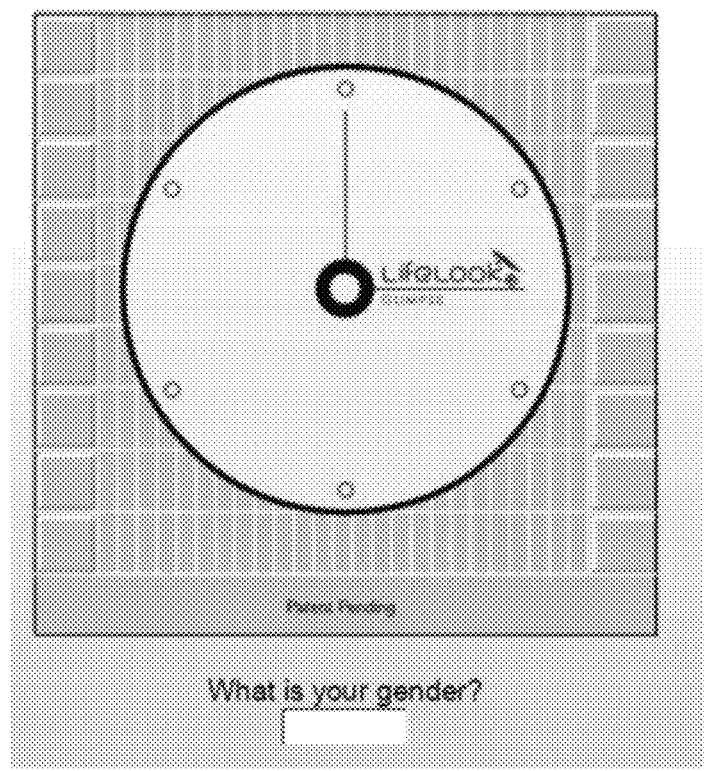
FIG. 2 is a plan view of a computer screen display first presented to an examinee on which examinee gender information entry is requested in accordance with the present invention.
Figure 3:
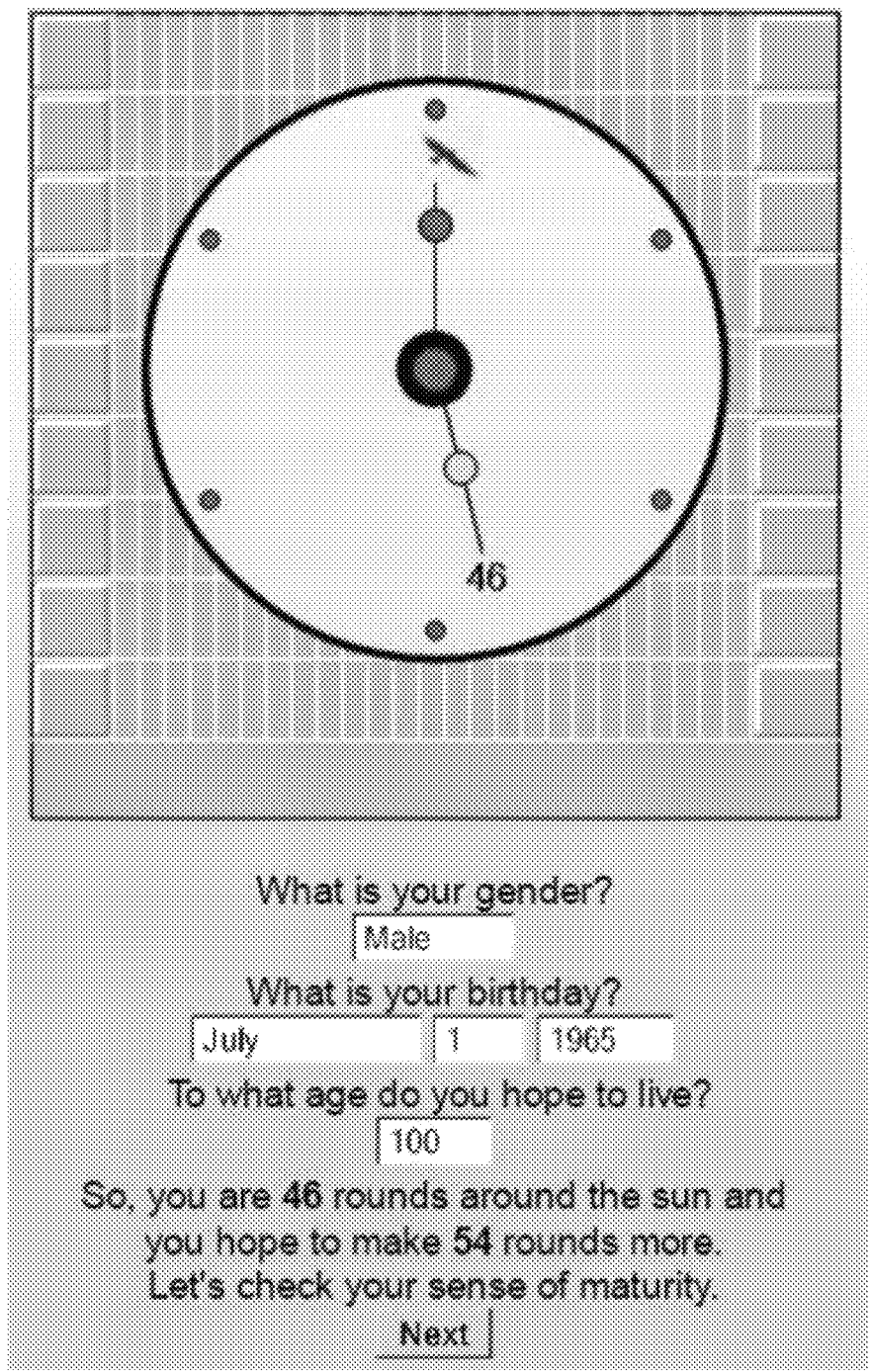
FIG. 3 is a plan view of a computer screen display showing gender, birth date and expected longevity information entered by the examinee and with the examinee's chronological age displayed.

To start, in a series of screen displays, the examinee is prompted to enter into a displayed data field the examinee's gender as illustrated in the computer screen display of FIG. 2. Next, as illustrated in FIG. 3, the examinee's date of birth and the age to which the examinee expects to live are entered into respective data fields. From the date of birth date the system uses its internal calendar clock to calculate the examinee's chronological or calendar age. It should be noted that the system, instead of prompting the examinee to enter his/her date of birth, could prompt the examiner to enter his/her chronological age directly and thereby eliminate the need for this calculation.

Figure 4:
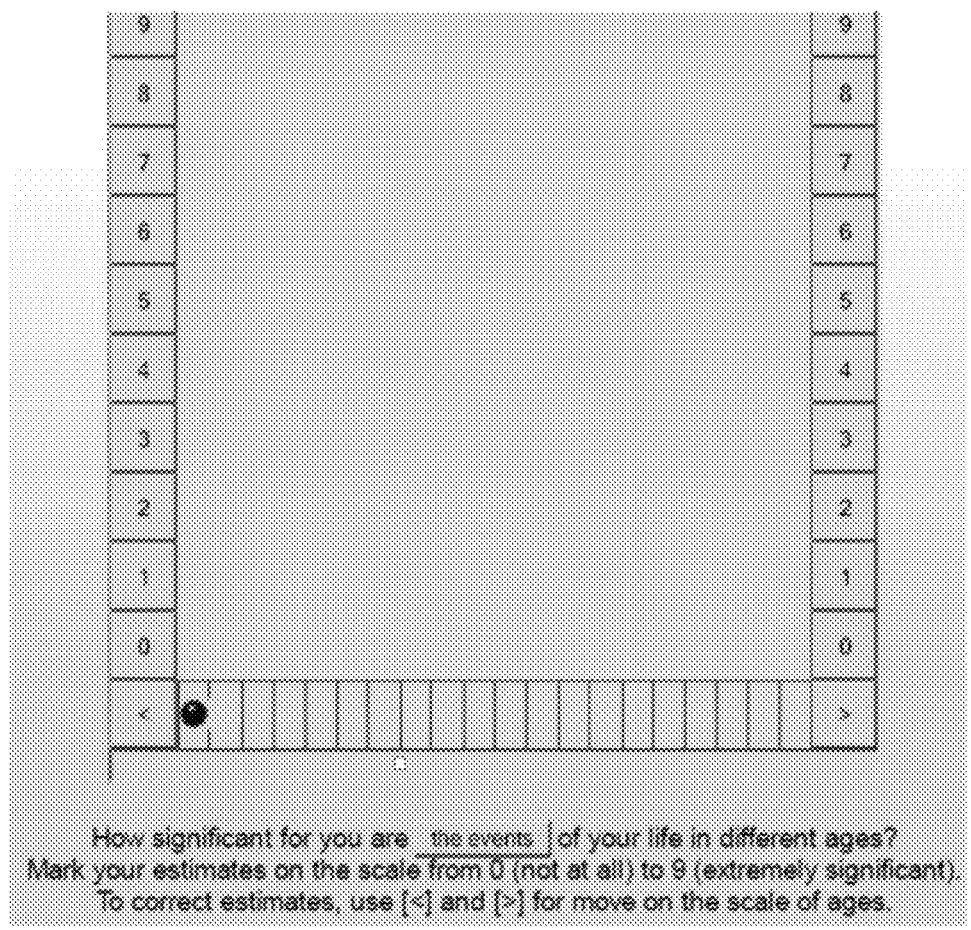
FIG. 4 is a plan view of a computer screen display showing a plot of estimated value points versus lifespan on which the examinee is to enter data.
Figure 5:
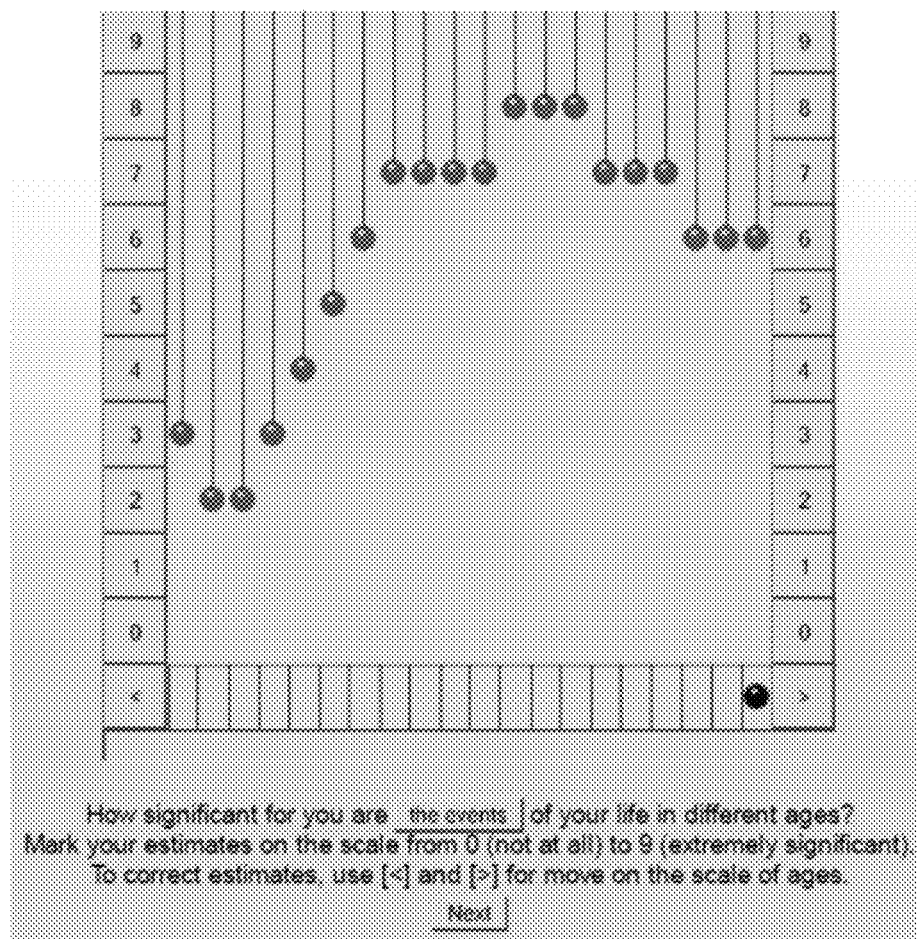
FIG. 5 is a plan view of a computer screen display showing the plot of FIG. 4 with data fully entered by the examinee.

Thereafter, the examinee is presented with a grid graph, as shown in FIG. 4, of estimated point values on the vertical axis versus time on the horizontal axis. The estimated point value scale is divided into ten discrete values from zero to nine. The horizontal scale for this embodiment is divided into five year time segments from birth to the age to which the examinee expects to live as entered into the system by the examinee as described in connection with FIG. 3. It is to be understood that the time segments can be for other specified time durations and that the last segment will not necessarily be for the same time durations as the others if the time duration is not an integral factor of the lifespan. In this example the examinee indicated an expectation of living to be one hundred years old; accordingly, the horizontal time scale is divided into twenty segments, each representing five different years of the examinee's life. A prompt on the screen requests the examinee to enter, for each five year time segment, a point value between zero and nine representing the subjectively estimated significance of life events that occurred (for past segments) or that the examinee expects to occur (for future life segments). The events can be events related, for example, to nature, family, health, spirituality, or emotions and thoughts in life in general and/or in work, leisure, etc. Point values are entered by clicking in the grid location corresponding to the column of the points estimate and the row of the time segment. The entry is followed by a display at that grid location, either as a bar extending from the horizontal axis to that location or an indicium such as an "x" or a ball, etc., at that location. Upon completion of point entries for all time segments the display on the screen provides a plot of the points versus lifespan as illustrated in FIG. 5. The plot defines a curve as a function of time which, in this example, shows higher point values assigned to the future years than in past years.

From the entered point values and expected lifespan the system calculates the psychological age of the examinee. This calculation uses the formula:

$$P_A = R = L,$$

where $P_A$ is the examinee's psychological age, L is the age to which the examinee hopes to live, and R is the subjective realization of the examinee's life determined from the entered point values.

For the preferred embodiment the subjective realization of life R is calculated as the ratio of the total of the past event point values (i.e., the total points for the time segments prior to the examinee's current age) to the total point values of the person's expected entire life. In other words, $R = P_{past}/P_{total}$, where $P_{past}$ is the total of event point values assigned by the examinee to his/her life up to the examinee's present age, and to $P_{total}$ is the total of event point values assigned by the examinee for his/her entire lifespan. The value of R is thus a fraction with a maximum value of one (i.e., the extreme and unlikely case wherein all lifespan event points are in the past segments of the examinee's hoped for lifespan) and a minimum value of zero (i.e., the other extreme and unlikely case where all of the event points are in the future segments of the examinee's hoped for lifespan). Larger values of R represent a point of view wherein the past is more significant to the individual than the future, thus making the person's psychological age $P_A$ older; such an individual typically feels older and has an older person's outlook. Smaller R values, on the other hand, yield younger psychological ages, and such individuals tend to have a brighter and more optimistic outlook on life. Thus, the computed psychological age $P_A$ of a person should be considered in comparison with that person's chronological age to provide a measure of the person's sense of contentment, self worth, outlook on life or other important psychological characteristics.

The method of calculating the subjective realization of life factor as described immediately above is the known Assessment of Five-Years Periods and is only one of several ways determining that factor. For example, the factor may be calculated using the known Self Assessment Test of Subjective Realization, the known Dichotomy Scaling of Lifespan method, the known Causometry method, or other methods, which are described in the books: *The Psychological Time of a Single Individual* by E. Golovakha and A. Kronik (Kiev: Naukova Dumka Publishers, 1984), and *Causometry: Methods of Self-Knowledge, Psychodiagnostics and Psychotherapy*, by A. Kronik and R. Akhmerov (Moscow: Smysl Publishers, 2003). Any of these or other approaches or techniques for calculating or measuring the subjective realization of life factor from the entered event point values may be employed in practicing the present invention. In some cases it may be desirable to measure neuro-physiological data to derive the value of R.

Figure 6:
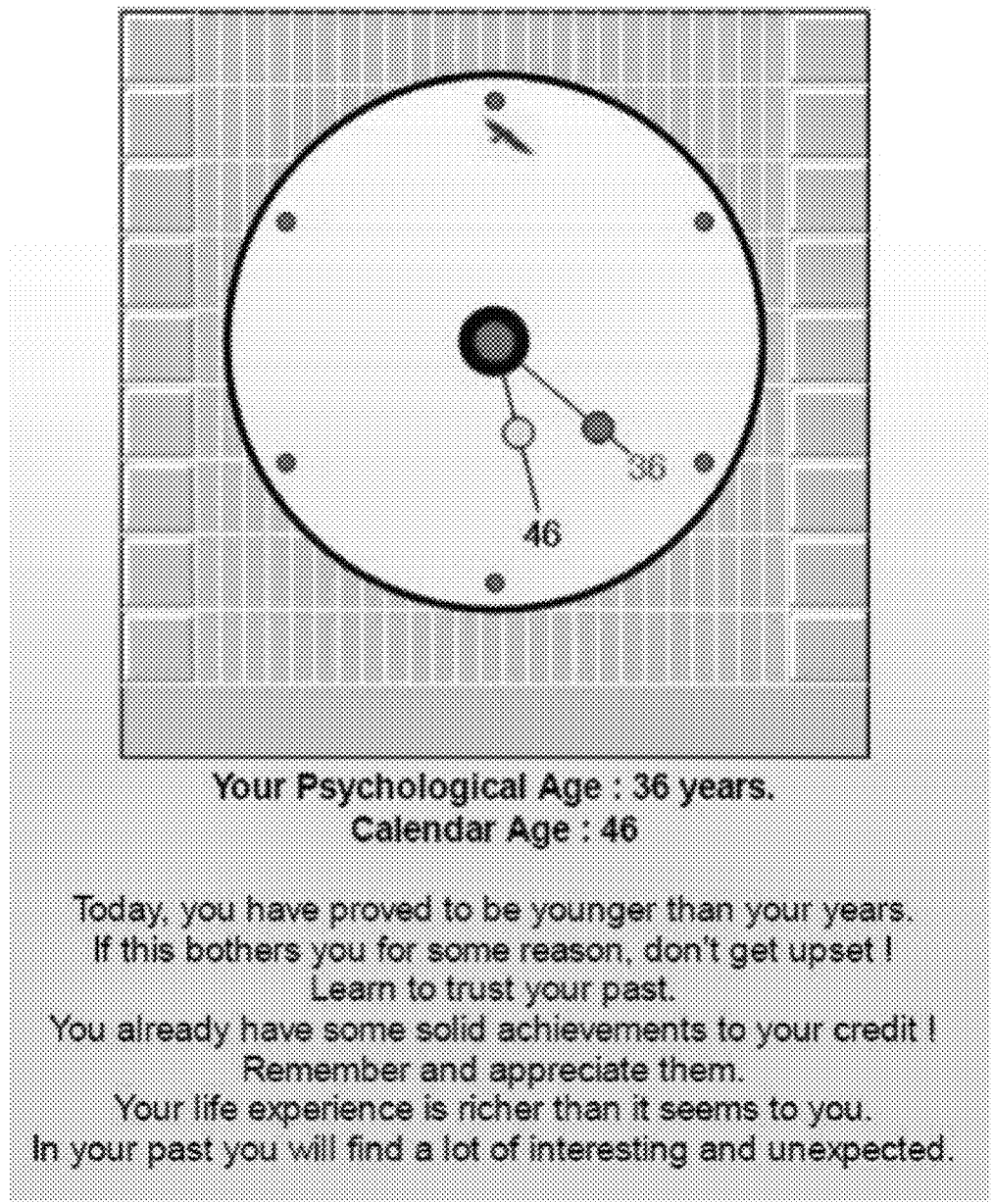
FIG. 6 is a plan view of a computer screen display of a clock face showing the results of the psychological test with the examinee's chronological and psychological ages displayed.
Figure 7:
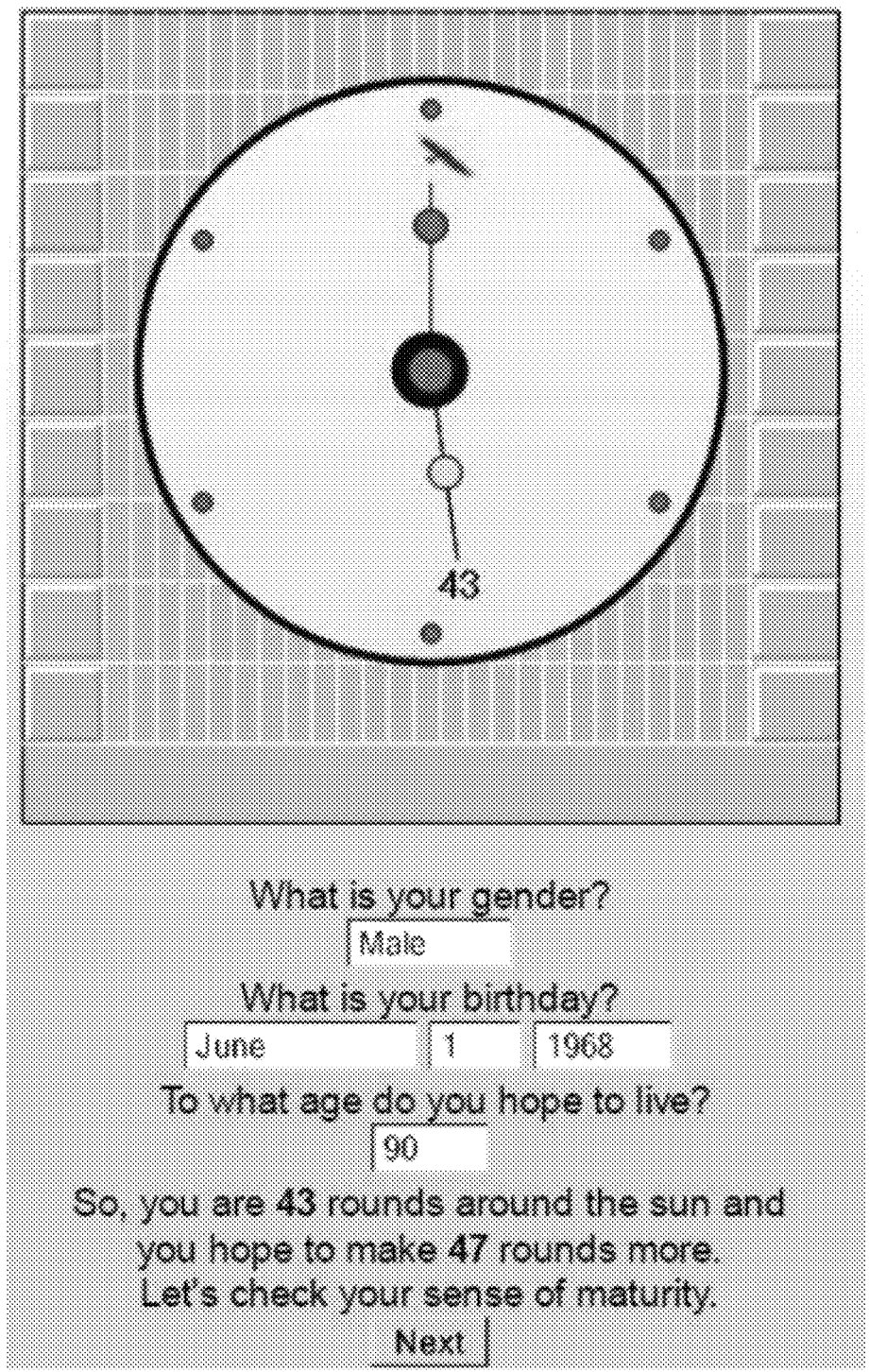
FIG. 7 is a plan view of a computer screen display showing gender, birth date and expected longevity information entered by a second examinee and with the second examinee's chronological age displayed.
Figure 8:
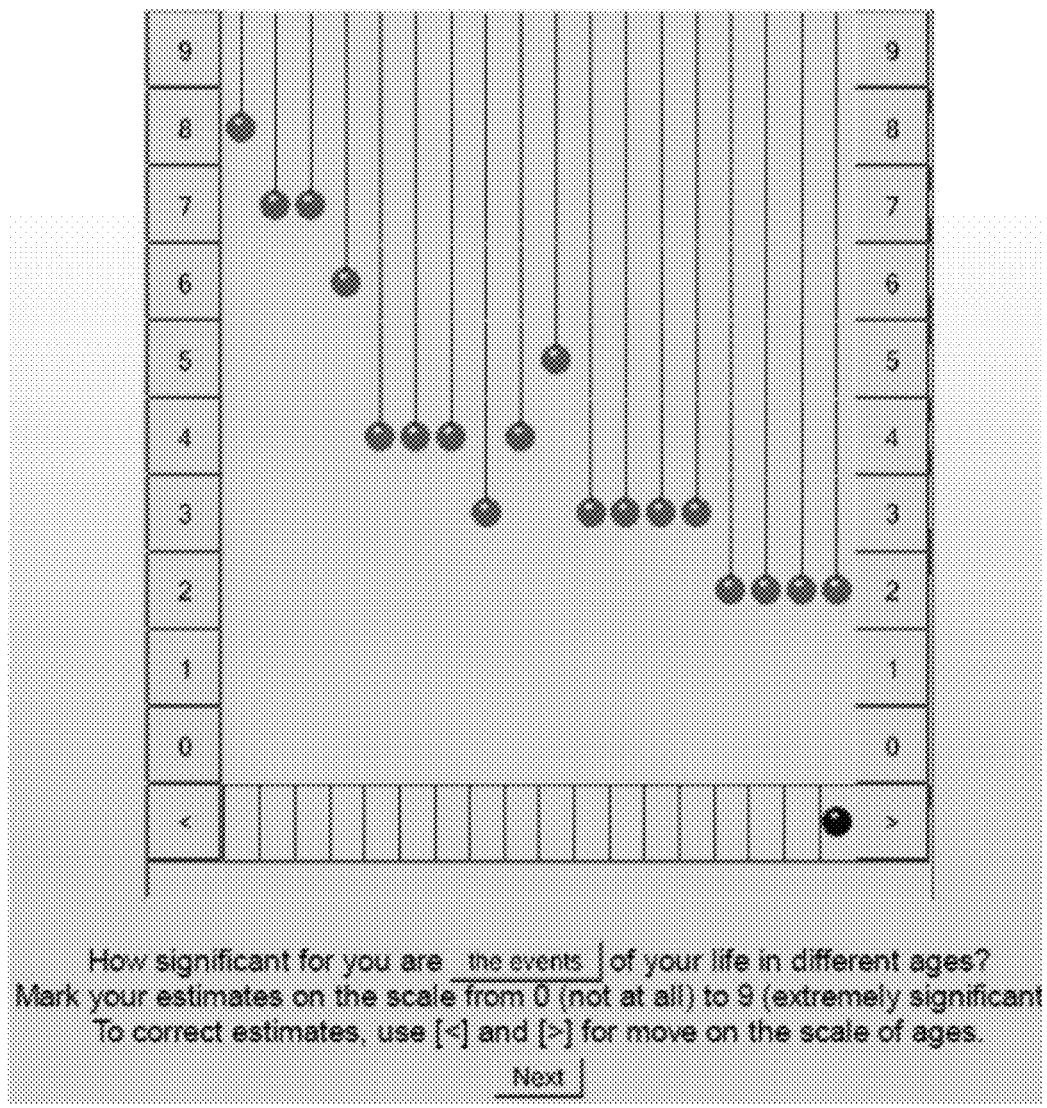
FIG. 8 is a plan view of a computer screen display showing the plot of FIG. 4 with data fully entered by the second examinee.
Figure 9:
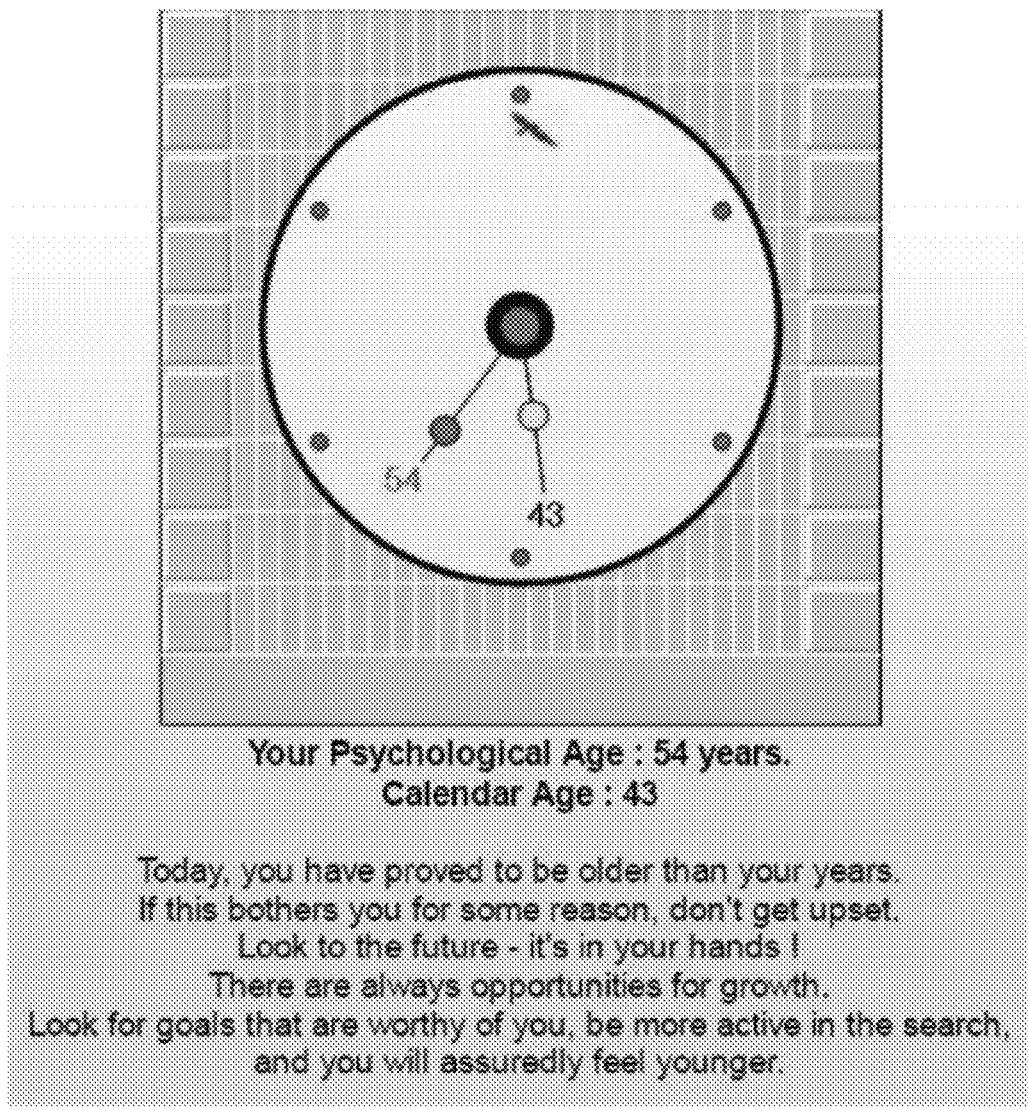
FIG. 9 is a plan view of a computer screen display of a clock face showing the results of the psychological test with the second examinee's chronological and psychological ages displayed.
Figure 10:
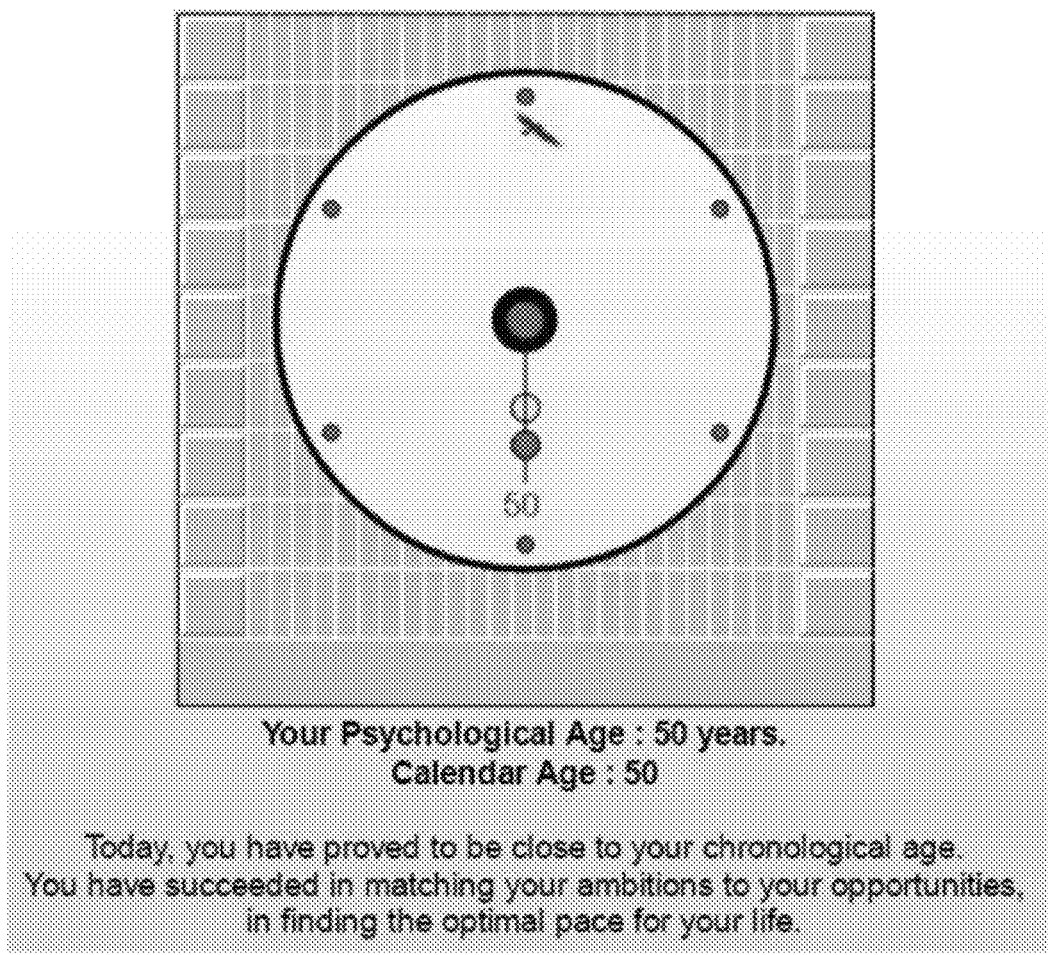
FIG. 10 is a plan view of a computer screen display of a clock face showing the results of the psychological test with a third examinee's chronological and psychological ages displayed.

The examinee is next prompted to click on a button displayed on the screen in order to view a comparison of his/her chronological age versus the calculated psychological age. This comparison, as shown in FIG. 6, is presented as a lifespan time scale in the form of a clock face (i.e., a circle) wherein the 360° scale represents the expected lifespan of the examinee and the indicator at the 12 o'clock position represents the expected longevity. The examinee's chronological age is represented as the angular location of a radial line (i.e., a simulated clock hand) corresponding to that age in the person's estimated lifespan. Thus, if the estimated lifespan is one hundred years and the examinee's chronological age is forty-six as illustrated in FIG. 6, the clock hand representing that chronological age will point to a location slightly before the six o'clock location.

The calculated psychological age is represented as the angular location of another radial line (i.e., another clock hand) corresponding to that age in the person's estimated lifespan. In the present example, R is calculated from the point values to be 0.36; therefore, the psychological age $P_A$ is calculated to be thirty-six years. The angular spacing between the two clock hands provides a visible and easy to understand comparison between the examinee's chronological and psychological ages. The specific method for representing the entered and calculated data on the computer screen as clock hands can be by any known method such as, for example, the methods described and illustrated in U.S. Pat. Nos. 6,201,769 (Lewis) 6,601,988 (Molander). The disclosures in those patents are incorporated herein by reference in their entireties.

The system may also provide a statement below or near the clock display describing the meaning of the difference between the examinee's chronological and psychological ages from the perspective of psychological analysis.

Although the clock-type display is well suited for visually comparing the examinee's chronological and psychological ages, it is understood that other types of displays may be similarly effective. For example, the lifespan time scale may be a linear scale having one end representing age zero or birth and an opposite end representing the entered age at the end of the entered expected lifespan. In this embodiment the chronological age indicator may be a line or other indicium located at a position on the lifespan scale corresponding to the chronological age. The psychological age indicator may also be a line or other indicium located at a position on that scale corresponding to the calculated psychological age. In such an arrangement the linear spacing between the first and second indicators along the lifespan scale is a measure of the difference between the chronological age and the psychological age.

Alternatively, the lifespan time scale may be a radial scale having a series of spaced concentric rings or other shapes (e.g., polygons) with a radial center representing birth and an outermost ring or shape representing the end of the entered expected lifespan. In this embodiment that chronological age indication is provided by visibly distinguishing one of the rings or shapes on the computer screen (such as by color, intensity, etc.) to represent the chronological age by its radial location relative to the center of the circles. Likewise, the calculated psychological age indication is provided by visibly, and preferably differently, distinguishing another of the rings or shapes to represent the calculated psychological age by its radial location relative to the center of the circles. In this arrangement the radial spacing between two visibly distinguished rings is a measure of the difference between the chronological age and the calculated psychological age.

Moreover, as an alternative to clock hands for an angular position display, the psychological and chronological indicators may be wedge shape indicators extending radially outward from the center of the display at the angle appropriate to the age indicator relative to the lifespan scale. The wedge shaped indicators may be differently colored, shaded or otherwise presented to distinguish them from one another.

Although the present invention is described in the context of a display on a computer screen, it will be appreciated that the clock face can be a structure, a projected display, a paper or plastic display, a puzzle, a knitted or silk-screened or otherwise applied display on an article of clothing such as a shirt or cap, or any other display of a time scale that permits comparison between an examinee's chronological and psychological ages.

The present invention may be viewed as presenting the speed of psychological time as a clock hand or similar indicator whose movement depends on the eventfulness of the examinee's current chronological age period.

The present invention may also be viewed as an examinee-based assessment presenting the balance between the examinee's psychological age and chronological age as a synchronicity quotient SQ, the value of which (from 1 to 100) depends on the examinee's psychological age $P_A$, chronological age $C_A$, expected lifespan L and personality traits. Represented in a short algorithm:

If $P_A < C_A$ then $SQ=100-[(C_A-P_A)/C_A] \times 100$; and

If $P_A \geq C_A$ then $SQ=100-[(P_A-C_A)/L-C_A] \times 100$

The Synchronicity Quotient may be displayed along with the chronological and psychological age indicators as a number or other indicium.

The preferred embodiment of the present invention is a new tool for assessment of psychological age of an individual. It is useful for improving an individual's self-awareness and preventing possible mental health problems.

It is to be understood that the Cartesian co-ordinate life graph grid illustrated in FIG. 4 may be presented with its axes turned ninety degrees, or in a polar co-ordinate or other understandable plot.

It is to be understood that two or more persons can simultaneously use the self-test described herein in a manner such that each person enters his/her own data and two or more displays are provided, either on two or more separate screens or in side-by-side relation on one screen.

Having described exemplary embodiments methods and apparatus for providing visual comparisons between psychological and chronological ages, variations and changes will be suggested to those skilled in the art in view of the teachings set forth herein. It is therefore to be understood that all such variations, modifications and changes are believed to fall within the scope of the present invention as defined by the appended claims.

I claim:

1. A method for providing on a screen of a computer a visible indication of the difference between the chronological age and the psychological age of an examinee, said method comprising the steps of:
   (a) storing for processing in a processor a first set of data entered by the examinee pertaining to the examinee's year of birth;
   (b) storing for processing in the processor a second set of data entered by the examinee pertaining to the examinee's lifespan expected by the examinee;
   (c) storing for processing in the processor a third set of data entered by the examinee containing, for successive predetermined time segments in the examinee's expected lifespan, life event data representing subjective relative significance of life events that have occurred in past time segments and that are expected by the examinee to occur in future time segments;
   (d) processing at the processor the entered life event data and expected lifespan of the examinee in the computer to calculate the psychological age of the examinee;
   (e) processing in the processor the first set of data to establish the chronological age of the examinee;
   (f) displaying on the computer screen a lifespan time scale normalized and defined by the examinee's expected lifespan with a time scale starting point at the examinee's birth and a time scale ending point at the end of the entered expected lifespan;
   (g) displaying on the computer screen a first indicator representing the examinee's chronological age at a first location on the lifespan time scale corresponding to said chronological age; and
   (h) displaying on the computer screen a second indicator representing the examinee's calculated psychological age at a second location on the lifespan time scale corresponding to said psychological age such that the spacing on said lifespan time scale between said first and second indicators represents the difference between the examinee's chronological age and calculated psychological age.

2. The method of claim 1 wherein step (f) includes displaying said lifespan time scale as an angular scale in the form of a circle simulating a clock face, wherein the expected lifespan subtends an arc of approximately 360°.

3. The method of claim 2 wherein step (g) comprises providing a first radial line simulating a clock hand at an angular position along said arc corresponding to said chronological age on said time scale, wherein step (h) comprises providing a second radial line simulating a clock hand at an angular position along said arc corresponding to said calculated psychological age on said time scale, and wherein the angular spacing between said first and second radial lines is a measure of the difference between the chronological age and the calculated psychological age.

4. The method of claim 1 wherein step (f) includes displaying said lifespan time scale as a linear scale having one end representing age zero or birth and an opposite end representing the entered age at the end of the entered expected lifespan.

5. The method of claim 4 wherein step (g) comprises providing a first indicator located at a position corresponding to said chronological age on said time scale, wherein step (h) comprises providing a second indicator located at a position corresponding to said psychological age on said time scale, and wherein the linear spacing between said first and second indicators is a measure of the difference between the chronological age and the psychological age.

6. The method of claim 1 wherein step (f) includes displaying said lifespan time scale as a radial scale having a series of spaced concentric shapes with a radial center representing birth and an outermost shape representing the end of the entered expected lifespan.

7. The method of claim 6 wherein step (g) comprises visibly distinguishing a one of said shapes to represent said chronological age on said radial time scale, wherein step (h) comprises visibly distinguishing an other of said shapes to represent the calculated psychological age on said radial time scale, and wherein the radial spacing between said one and said other shapes is a measure of the difference between the chronological age and the calculated psychological age.

8. The method of claim 1 wherein the psychological age $P_A$ of the examinee is calculated from the formula $P_A = R \times L$, where L is the subjectively expected lifespan, and $R = P_{past}/P_{total}$, where $P_{past}$ is the total of entered subjective point values from birth to the present date, and $P_{total}$ is the total of entered subjective point values for the entire lifespan.

9. The method of claim 1 wherein said life event data are respective subjective point values entered by the examinee, and further comprising the steps of:
   (i) processing in the computer and displaying on the computer screen a temporary scale representing the years of the examinee's lifespan subdivided into a series of said predetermined time segments; and
   (j) in response to entry of said subjective point values, providing a value indication associated with the time segments for which the point value was entered.

10. The method of claim 1 further comprising the step of processing in the computer the data entered by the examinee and displaying on the computer screen an indication of a synchronicity quotient SQ as a function of the psychological age $P_A$ and the chronological age $C_A$, where:

if $P_A < C_A$ then $SQ = 100 - [(C_A - P_A)/C_A] \times 100$; and if $P_A \geq C_A$ then $SQ = 100 - [(P_A - C_A)/(L - C_A)] \times 100$.

11. The method of claim 1 wherein access to the processor by the examinee is via the internet.

12. In connection with a psychological test wherein an examinee provides information pertaining to the examinee's chronological age, subjectively expected lifespan and subjective point values for significant events occurring in predetermined time segments in said expected lifespan, a method for providing a visible comparison of the examinee's chronological age and the psychological age, said method comprising the steps of:

(a) establishing a lifespan time scale normalized and defined by the examinee's entered expected lifespan with a time scale starting point at the examinee's birth and a time scale ending point at the end of the entered expected lifespan;

(b) providing a first indicator representing the examinee's chronological age at a first location on the lifespan time scale corresponding to said chronological age;

(c) processing in a computer data representing the point values and expected lifespan and calculating from the processed data said psychological age; and (d) providing a second indicator representing the examinee's psychological age at a second location on the lifespan time scale corresponding to said psychological age such that the spacing on said lifespan time scale between said first and second indicators represents the difference between the examinee's chronological age and psychological age.

13. The method of claim 12 wherein:

step (a) includes establishing said lifespan time scale as an angular scale in the form of a circle simulating a clock face, wherein the expected lifespan subtends an arc of approximately 360°;

step (b) comprises providing a first radial line simulating a clock hand at an angular position along said arc corresponding to said chronological age on said time scale;

step (d) comprises providing a second radial line simulating a clock hand at an angular position along said arc corresponding to said calculated psychological age on said time scale such that the angular spacing between said first and second radial lines on said time scale is a measure of the difference between the chronological age and the calculated psychological age.

14. The method of claim 13 wherein the clock face is presented as a display on a computer screen.

15. The method of claim 12 wherein:

step (a) includes establishing said lifespan time scale as a linear scale having one end representing age zero or birth and an opposite end representing the entered age at the end of the entered expected lifespan;

step (b) comprises providing a first indicator located at a position corresponding to said chronological age on said time scale;

step (d) comprises providing a second indicator located at a position corresponding to said psychological age on said time scale such that the linear spacing between said first and second indicators on said time scale is a measure of the difference between the chronological age and the psychological age.

16. The method of claim 12 wherein:

step (a) includes establishing said lifespan time scale as a radial scale having a series of spaced concentric rings or other shapes with a radial center representing birth and an outermost ring or other shapes representing the end of the entered expected lifespan;

step (b) comprises visibly distinguishing a one of said rings or other shapes to represent said chronological age on said radial time scale;

step (d) comprises visibly distinguishing another of said rings or other shapes to represent the calculated psychological age on said radial time scale such that the radial spacing between said one and said other rings or other shapes on said time scale is a measure of the difference between the chronological age and the calculated psychological age.

\* \* \* \* \*